United States Patent [19] [11] 4,414,549
Wichmann [45] Nov. 8, 1983

[54] METHOD AND APPARATUS FOR SENSING A TARGET

[75] Inventor: Günter Wichmann, Heidelberg, Fed. Rep. of Germany

[73] Assignee: Licentia Patent-Verwaltungs-GmbH, Frankfurt am Main, Fed. Rep. of Germany

[21] Appl. No.: 130,024

[22] Filed: Mar. 31, 1971

Related U.S. Application Data

[63] Continuation-in-part of Ser. No. 721,136, Apr. 10, 1968, abandoned.

[30] Foreign Application Priority Data

Oct. 28, 1967 [DE] Fed. Rep. of Germany ....... 1591117

[51] Int. Cl.[3] .......................... G01S 7/36; F42C 13/04
[52] U.S. Cl. ................................ 343/18 E; 343/7 PF
[58] Field of Search ................. 343/7 PF, 13 R, 18 E

[56] References Cited

U.S. PATENT DOCUMENTS 3,308,458 3/1967 Schulze ......................... 343/13 R X
3,357,015 12/1967 Wichmann ................... 343/13 R X
3,366,956 1/1968 Westby ............................ 343/13 R
3,562,752 2/1971 Roeschke ..................... 343/7 PF X
3,870,996 3/1975 Miller ............................... 343/18 E

*Primary Examiner*—T. H. Tubbesing
*Attorney, Agent, or Firm*—Spencer, Kaye & Frank

[57] ABSTRACT

A device is provided for use in a proximity-type fuze which includes a rectangular wave generator, the output of which is differentiated to provide pulses for exciting an antenna, which pulses are at the same time used to bias one or more diodes to conduction for passing signals reflected by a target to a sawtooth wave generator whose sawtooth output has its magnitude and period controlled by the differentiated pulses, the sawtooth output having its magnitude controlled by the signals reflected from the target and particularly the time relationship of the latter relative to the period of the rectangular wave.

13 Claims, 8 Drawing Figures

METHOD AND APPARATUS FOR SENSING A TARGET

OTHER APPLICATIONS

This Application is a continuation-in-part of My Prior U.S. Application Having Ser. No. 721,136, Filed on Apr. 10, 1968, now abandoned.

DRAWINGS

FIGS. 1(*a*) and 1(*b*) show a proximity fuze which operates according to the process of the invention respectively in end view and side section;

DETAILED DESCRIPTION

Figure 1B:
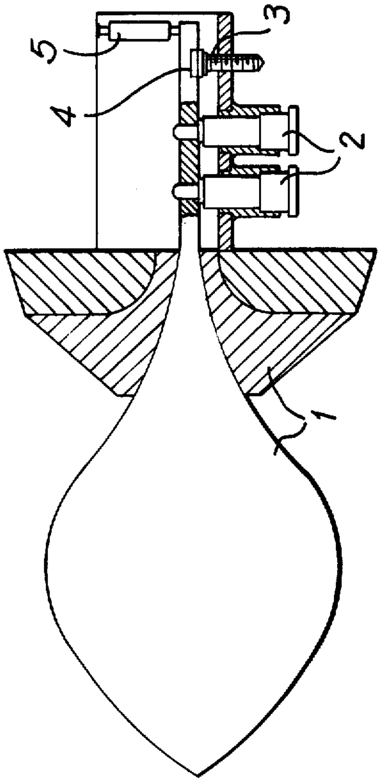

The invention relates to processes and equipment for locating objects, including moving objects, by means of electromagnetic radiation.

Locating systems of this kind are required, for example, for triggering the fuzes of projectiles upon their approach to suitable targets. In air-to-ground applications, it is the task of the fuze to detonate the missile upon ground approach at a certain altitude without its precise triggering operation being affected by the nature of the ground surface or by the presence of trees.

In air-to-air application, the missle should be triggered by the fuze in proximity of the target only if the target would otherwise be altogether missed so that a direct hit would not be prevented.

Both types of the aforementioned fuzes should be suitable for several kinds of projectiles or missiles.

Some known electronic distance or proximity fuzes operate by utilizing the Doppler effect and have essentially the disadvantage that the triggering distance cannot be set very accurately, and this insufficient accuracy is moreover disadvantageously affected by the nature of the ground surface and by the presence of trees (foliage, roofs, etc.). Additionally, for all practical purposes, it is necessary to develop a special fuze for every individual type of projectile or missile, since it is this object itself which serves as the antenna and thus affects the behavior of the fuze. Finally, these known systems are very vulnerable to jamming transmitters.

An object of the invention is to obtain a low-frequency image of an originally high-frequency pulse by a method of interception by a pulse-modulated radar using a receiving system working according to the sampling method.

The invention is based on the objective of overcoming the aforesaid definiencies. This is accomplished by the use, according to the invention, of only a single antenna for transmission and reception, and by having the transmission impulse generator generate single impulses or periodic pulses, which are utilized both as transmission and as switching or scanning impulses for the purpose of turning on a receiving diode and of providing for the received return impulse a scanning system in which the necessary time shift between the impulse received and to be depicted and the scanning impulse is obtained from interval to interval on the basis of the movement of the reflecting object relative to the antenna.

The system according to the invention is thus based on a mere measurement of travel time, in which an extremely short burst of transmitted energy, after reflection from the target object, is received and processed by a considerably simplified sampling system. For this purpose, a single antenna only is used, which serves both as a transmitting and as a receiving antenna.

The extremely short transmission impulses are generated through d-c surges of extremely high velocity by means of a suitable switching element, for example, a tunnel diode or a step-recovery diode. With switching times of less than 100 micromicroseconds, the occurring switching fronts will contain components, which exceed the X-band and can easily be radiated and also readily received by extremely small antennas.

The arrangement illustrated in FIGS. 1(*a*) and 1(*b*) is a tested example of proximity fuze with coaxial omnidirectional radiator 1 with two receiving diodes 2, a tunnel diode 3 serving as an impulse generator, a capacitor 4 and a terminating resistor 5. In lieu of two receiving diodes, it is also possible to use only one receiving diode. In lieu of the tunnel diode 3, a step-recovery diode can be used as element 3.

Figure 2:
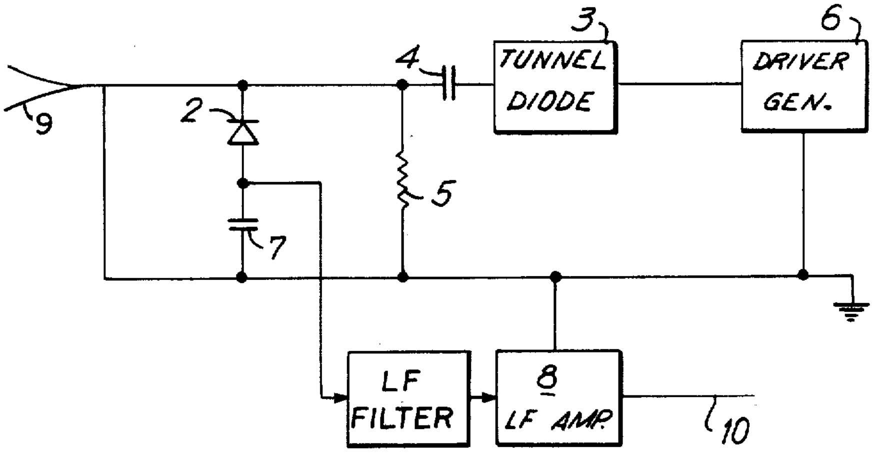
FIG. 2 is a block diagram of a unit according to the invention.
Figure 3:
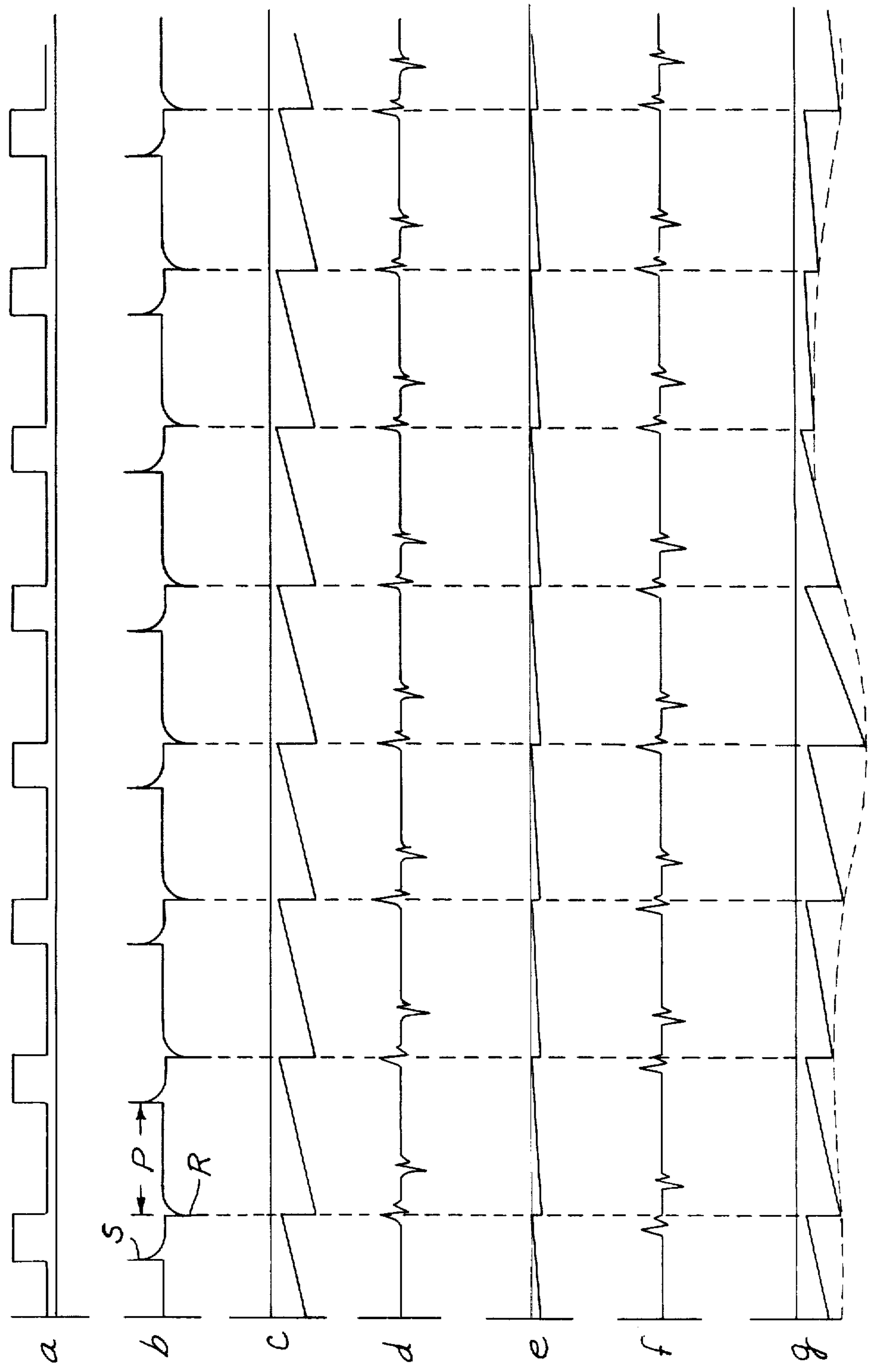
FIG. 3 shows oscillograms of pulses as they occur in the process according to the invention.

According to the block diagram shown in FIG. 2, the tunnel or the step-recovery diode 3 is caused to switch by a driver generator 6 so that at its terminals rectangular-waveform a of FIG. 3 is produced. This voltage is differentiated by the capacitor 4 to produce waveform b of FIG. 3 so that both switching fronts S & R are radiated by the antenna 9. The negative impulse R additionally serves as a scanning impulse and turns on the otherwise reverse-biased receiving diode 2. It charges a capacitor 7 in which a sawtooth voltage is thus generated, the amplitude of which will vary as a function of the switching impulse amplitudes as shown at waveform c of FIG. 3. An LF amplifier is indicated at 8, its signal being indicated at output 10. In the absence of a target reflection, there occurs at the capacitor 7 a sawtooth voltage, whose basic frequency is the pulse sequence frequency. No LF signal exists in this case.

If a target is located in front of the fuze at a distance corresponding to a signal travel time, which is equal to the time interval between the first and the second transmission impulse, the first transmission impulse refected by the target will coincide on the receiving end with the switching impulse R which turns on the receiving diode.

Through addition of the amplitudes of both voltages of waveforms b and d of FIG. 3, the sawtooth amplitude will become either a little greater or a little smaller, so that with constant distance of the fuze from the target, a d-c variation will occur at the charging capacitor 7 as shown at waveform e of FIG. 3, without the presence of an LF signal. If the target moves relative to the fuse, then the travel time "fuze-target-fuze" will vary, and the switching impulse will not always meet the same portion of the received impulse, but will scan from interval to interval a different amplitude value of the received impulse as shown at waveform f of FIG. 3, so that the sawtooth voltage at the charging capacitor 7 will undergo gradual changes of its peak amplitude, which correspond to the time position of the received impulses as shown at waveform g of FIG. 3. Accordingly, an LF image of the received HF impuse is presented to the input of the LF amplifier 8 according to waveform f of FIG. 3. No signal resulting from the scanning impulse will itself be processed on the receiving end, because at the moment of its arrival the receiving diode 2 is turned off.

In order to prevent that a target-echo impulse returning from a greater distance could be made to appear by the scanning impulse of the subsequent interval, a pause P is inserted between every two pairs of transmission impulses waveform a of FIG. 3, which has been chosen sufficiently long to make the distance, from which an eventual target-echo impulse would have to originate, so far that it would come in too weak to be still received.

The entire evaluation system on the receiving end is similar to a sampling system. There is, however, the essential difference that neither the transmission impulse nor the sampling impulse is modulated by the necessary time difference from interval-to-interval. On the contrary, this time lag between the associated impulse is automatically derived from the relative movement of the target object with respect to the proximity fuse.

Figure 4:
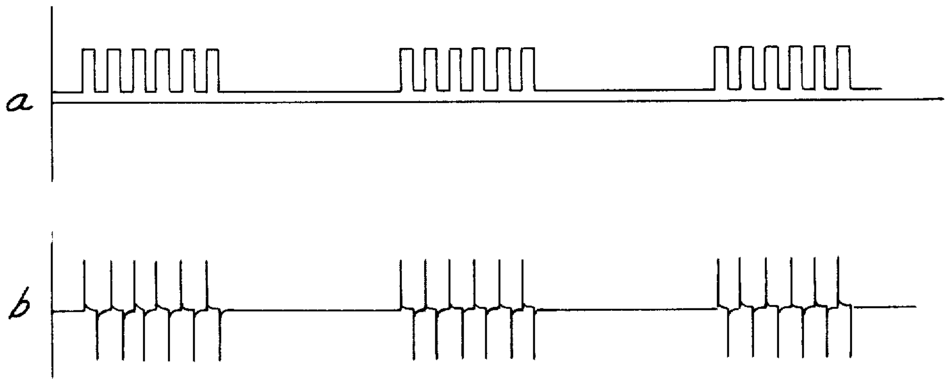
FIG. 4 shows a further impulse oscillogram.

For this reason, the frequency content of the HF impulse, transposed to the LF range, is, in addition to the carrier frequency of the transmission impulses, also dependent upon the relative velocity of movements between fuze and target, so that, through the choice of a suitable LF filter, the fuze can be provided with selectivity relative to speed. The fuze can be adjusted in such a manner that it is sensitive only to one particular distance. There are cases, however, where it is necessary to extend surveillance over an entire range of distances. For this purpose, it is necessary to release several pairs of impulses in close succession. In this manner, the fuze is made sensitive for many distances and, if the pairs of transmission impulses follow each other closely enough, the fuze can finally be sensitized for a continuous range of distances (waveforms a and b of FIG. 4).

As antennas for the distance fuze operating according to the process of the invention, there can be used both coaxial omnidirectional radiators and also exponential band guide antennas. In any case, the antenna must have a pronounced wide-band characteristic since the frequency content of the transmission impulses ranges from 3 to 10 Gigacycles.

The coaxial omnidirectional radiator has in this context the advantage of being rotationally symmetrical, and, moreover, it assures, especially for utilization of the fuze in air-to-air applications, the most desirable radiation characteristic (hemispherical with a blind cone in flight direction) for making possible the realization of a direct hit in case the weapon moves straight into the target.

In order to reduce further the susceptibility to jamming radiations (amplitude modulated continuous-dash jamming signal) there can be, as shown in FIGS. 1(*a*) and 1(*b*), two receiving diodes 2 arranged in the receiving system at such a distance from each other that between them there will result a travel-time differential corresponding to one-half wavelength of the frequency to be received. In this case, two LF images of the received HF signal are obtained with a 180-degree phase shift between them.

If both are mixed subtractively, a signal of double amplitude is obtained. Contrary hereto, all LF modulation voltages from jamming transmitters will compensate each other completely, since they will appear with identical phasing at both receiving diodes. All HF voltages, for which the present travel time differential will not correspond to ½ wavelength, will at least partially subtract from each other.

The process disclosed above makes it possible to measure with high accuracy distances amounting to a few cm. only. The process is based on the measurement of travel time of extremely short bursts of transmission generated by d-c surges or impulses of very high velocity and intensity from a suitable switching element such as, for example, a tunnel diode or a step recovery diode coupled to a wide-band antenna at its base point.

With switching intervals of less than 100 micromicroseconds, the switching fronts created contain frequency contents which exceed the X-band and can be emitted and received very easily by very small antennas. According to what has been disclosed above, only a single antenna is used for transmitting and receiving, and the impulses generated by a transmission impulse generator of the kind outlined above are utilized both as transmission impulses and as switching and/or scanning impulses for turning on a receiving diode and for additionally providing a scanning process for the received impulse, in which the necessary time lag between the received impulse to be depicted and the scanning impulse is obtained from interval to interval out of the movement relative to the antenna of the object to be located. The evaluation process on the receiving end corresponds up to a certain degree to a known sampling process. However, there is one cardinal difference, namely, that neither the transmission pulse nor the scanning pulse receives its phase modulation necessary from interval to interval through any additonal means, since the time shift between the related impulses is automatically derived from the movement relative to the antenna of the object to be located (the target).

Consequently, the scanning impulse which opens the receiving diode will scan from interval to interval a different amplitude value of the received reflected impulse, so that the sawtooth voltage generated at the charging capacitor connected behind the receiving diode is subjected to gradual changes of its amplitude, which correspond to the time incidence of the received impulses.

Thus, at the input of the subsequent low-frequency amplifier there results a low frequency image of the received high-frequency impulse, which is suitable for further evaluation.

As already explained, such a process serves for radar locating and, for example, to trigger automatically the fuzes of projectiles or missiles at the moment of their approach to a predetermined target.

The above process offers important advantages with regard to the reliability of the proximity fuze, especially on account of the fact that the desired distance from the target, at which the fuze is to be triggered, can be set very accurately, which is not possible with proximity or distance fuzes operating, for example, on the CW Doppler radar system. The new process permits, with transmission impulse wavelengths of 15 cm., measuring distances in air with a precision of better than ±5 cm., and the nature of the target surface or of the earth's surface does not have any influence at all, as long as the target echo impulse has sufficient amplitude.

In FIG. 2 of the drawing is shown a driver generator 6. This driver generator drives a tunnel diode 3 or the equivalent thereof, which generates a rectangular-wave signal. The rectangular-wave signal is differentiated by the differentiating circuit consisting of capacitor 4 and resistor 5. The generation of the rectangular signals appears in waveform a FIG. 3, and the differentiated signal appears in waveform b of FIG. 3, wherein a positive pulse appears in synchronism with the leading edge of each rectangular pulse and a negative pulse appears in synchronism with the trailing edge thereof.

These pulses are forwarded to an antenna 9 by which they are transmitted towards a target which serves to reflect the same. At the same time, the negative impulses serve as scanning impulses and turn on an otherwise reverse-bias receiving diode 2, whereby a capacitor 7 is charged in which a sawtooth voltage is thus generated, the amplitude of which varies as a function of the switching impulse amplitude (see waveform c of FIG. 3).

Figure 1A:
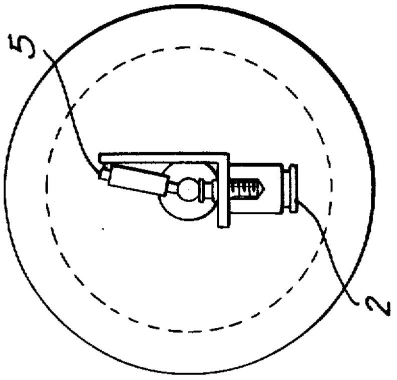

If a target is located in front of the proximity fuze illustrated in FIGS. 1*a* and 1*b*, the transmitted pulse will be reflected and returned to the system via the antenna 9. The sawtooth amplitude will either increase or decrease, as illustrated, for example, in waveforms e and g in FIG. 3, thereby giving an indication of the distance of the target from the antenna.

Broadly considered as a method, there is provided a pulse radar method for use with a transmitter which transmits pulses and with a receiver system including an antenna and adapted for displaying received high-frequency pulses in a low-frequency range, this low-frequency range being the frequency of the sawtooth wave referred to hereinabove.

The method comprises generating feeling pulses having a constant adjusted delay relative to the transmitter pulses and utilizing the phase difference between the feeler pulses and the received pulses in accordance with the movement of the target relative to the transmitter and receiver antenna.

What the above is intended to mean is that the phase difference between the pulses opening diode 2 and those reflected by a target are employed to control the shape of the generated sawtooth wave which is displayed to show the movement of the target relative to the antenna 9. This technique is used particularly in the oscillograph technique, for example, sampling oscillographs made by Hewlett-Packard. The sampling technique facilitates the visual disply of extremely short periodic, repetitive pulses of the oscillograph screen. For this purpose, use is made of a feeler or sampling pulse which either is a phase modulated or has a somewhat different sequential frequency with respect to the pulse to be displayed. Both pulses, namely, the high-frequency pulse to be displayed and the feeler pulse, are processed in a sampling circuit in such a way that the feeler pulse coincides at each period with a different instantaneous value of the pulse to be displayed. Consequently, there appear, at the output of the circuit, pulses having an amplitude which is a function of the amplitudes of the feeler pulse and of the corresponding instantaneous value of the pulse to be displayed. The feeler pulses are, therefore, amplitude modulated. For example, by integration of the amplitude modulated pulses, there is obtained an oscillation which is the low-frequency image or representation of the original high-frequency pulse.

The foregoing procedures are substantially representative of the sampling technique principle which has become accepted in the art; see, for example, WICHMANN, Ser. No. 475,826, now U.S. Pat. No. 3,357,015, and U.S. Pat. No. 3,557,015, column 1, lines 58 to 65.

As a feature of the present invention, the change of the phase difference between the scanning pulse and the pulse to be received, occurs inherently during the approaching of the target to be intercepted, so that the requirement for additional devices is obviated. The outgoing pulses remain constant and uninfluenced at each instant of time. Only the phase difference, of the reflected pulses, changes in comparison to the transmitted pulses, automatically, caused by the change of the distance of the object from the antenna.

In addition, it is possible to provide the proximity fuze with speed selectivity and, if necessary, to sensitize it for a number of triggering distances and even for a continuous range of distances.

The field of applications also require the possibility of neutralizing jamming activities of all kind, and, in particular, the proximity fuze will have to be absolutely ECM-proof.

Since the receiving diode in the receiving system is shut-off by reverse biasing, and only turned on by a scanning impulse for the target-echo impulse, any jamming of the fuze system by a continuous-dash microwave transmitter is practically impossible.

Amplitude-modulated, continuous jamming signals can, as already explained, be eliminated by the provision in the receiving system of two receiving diodes mounted at such a distance from each other that a travel time difference corresponding to one half wavelength of the frequency of the useful signal to be received will result. In this case, two LF images of the received HF signal are obtained, which are in 180° phase opposition to each other. Subtractive mixing of both LF signals produces a signal of double amplitude. On the other hand, all LF modulation voltages originating from jamming transmitters will be eliminated, since they will appear in phase at both receiving diodes and be nullified by the subtraction that follows. All HF voltages, for which the travel time difference will not amount to ½ wavelength, must result in at least partial subtraction.

The present invention also has the objective of excluding completely the danger of interference from phase and frequency-modulated jamming signals.

Based on the process for radar-location described above, the invention creates two LF images of a received HF signal in such a manner that two receiving diodes, as a result of a predetermined travel-time distance between them, are subsequently turned on by one or more scanning impulses selected from a transmission impulse series and the received HF signal fed to the receiving diodes according to the rhythm of their turned on conditions.

The time difference for the turn-on moments for the two receiving diodes results from the order of magnitude of the impulse lengths of the transmitting impulses. Consequently, this has the effect that at no time will there be LF signals present simultaneously at both LF outputs of the receiving system if a genuine target-echo impulse is being received, but that a well defined time difference will be present between the two LF images. Such a time difference, however, will be completely absent when a wobbled jamming signal is being received, of which, on account of its phase and frequency variations, LF images will also be obtained. The LF signals occurring in this case are always in phase, so that they can be easily eliminated by subtractive mixing.

Thus, it is possible, without difficulties, to utilize the ascertained phase difference between the two LF signals as the unmistakeable identification of genuine target-echo impulses.

Figure 5:
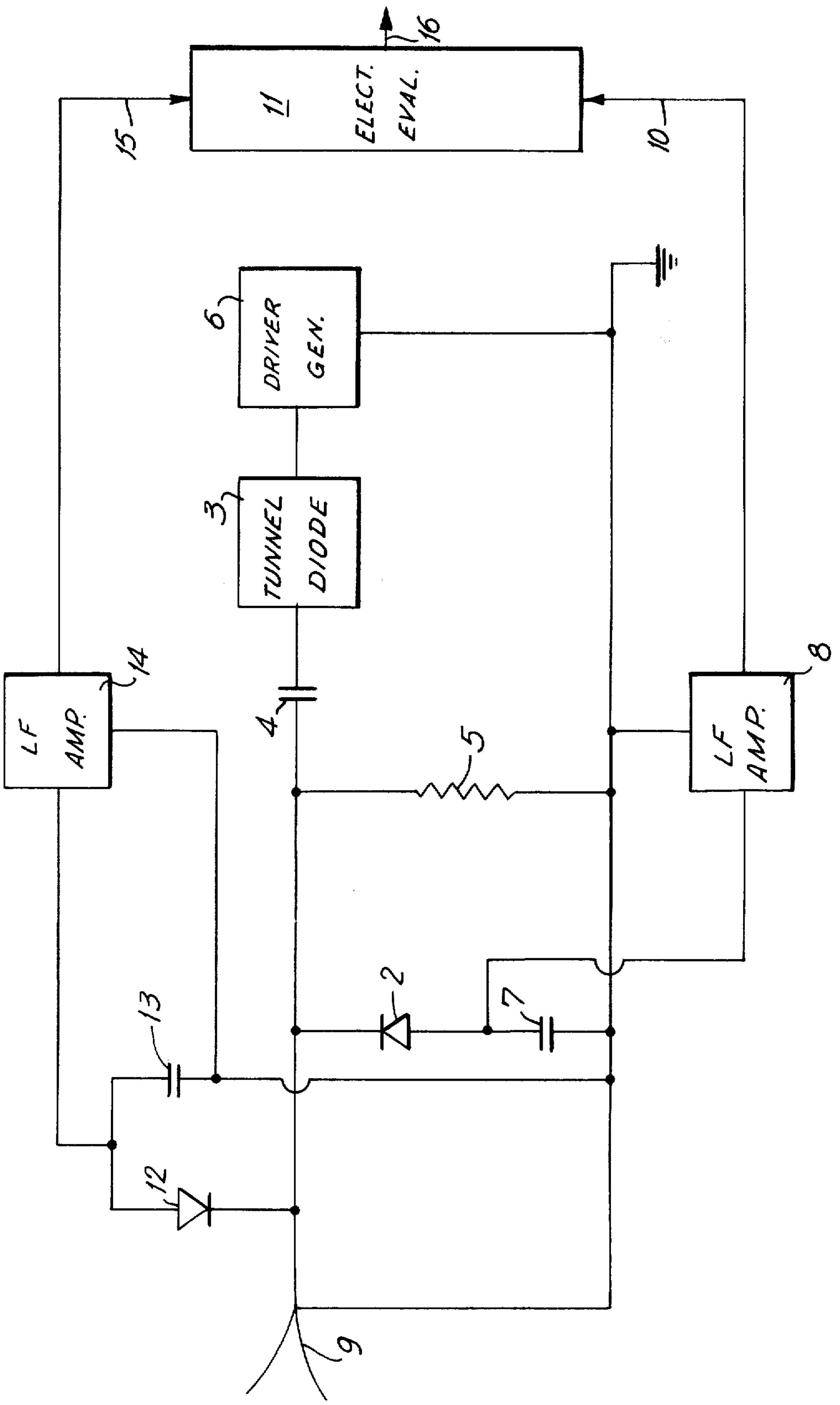
FIG. 5 is a block diagram of an anti-jamming arrangement, in which only a single scanning impulse, selected from a transmitting pulse series, is being utilized.

According to FIG. 5, tunnel or step-recovery diode 3 is caused to switch by driver-generator 6 so that a rectangular-wave voltage is produced at its terminals. By capacitor 4 connected in series with terminating resistor 5, this voltage is differentiated so that within one pulse sequence interval a pair of transmitting impulses is obtained, of which one has a positive and the other a negative switching front. Both transmitting impulses are then radiated with a travel time difference (determined by the duration of the rectangular-wave impulse) from an antenna 9 having the configuration of an exponential band guide antenna. Simultaneously, the negative impulse is used as a scanning impulse in the following manner:

First of all, it turns on the receiving diode 2 through which it charges the charging capacitor 7 to its maximum value. Shortly thereafter, the scanning impulse also reaches an additional receiving diode 12, so that this diode is also turned on and its associated capacitor 13 charged.

The arrangement of the two receiving diodes 2 and 12 is chosen in such a manner that there will result from their defined locations a certain travel time difference for the arrival of the scanning impulse. While this occurs, the receiving diodes 2 and 12 will show identical polarity concerning the scanning impulse. Each of the charging capacitors 7 and 13 is connected to an LF amplifier 8 and 14, from each of which signal outputs 10 and 15 are connected to an electronic evaluator 11 which serves to effect subtractive mixing of the signals, as explained above, this being effected by a conventional arrangement of discriminators and substractors.

Figure 6:
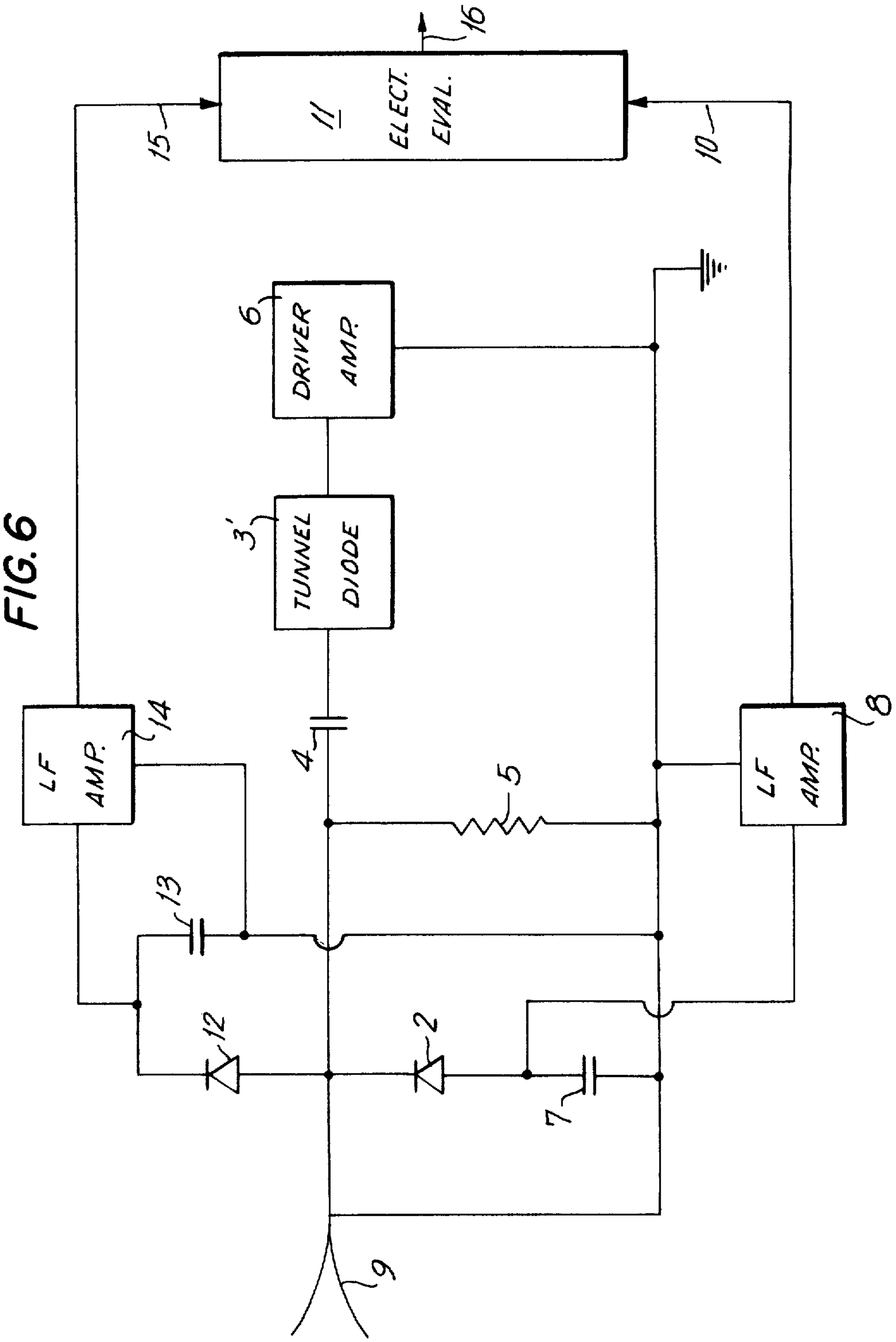
FIG. 6 is a block diagram of an anti-jamming arrangement wherein two scanning impulses are used.

The block diagram shown in FIG. 6 differs from the circuit according to FIG. 5 only in that it provides for the utilization of two scanning impulses and in that the arrangement of the receiving diodes 2 and 12 has been modified as a consequence thereof.

In the impulse generating system with the driver generator 6 and the transmitting diode arrangement 3', a rectangular-wave voltage with two rectangles of different lengths is formed, with the block 3' containing two tunnel or two step-recovery diodes. By differentiating these rectangular impulses with the capacitor 4, as transmitting impulse sequence is generated, in which within the pulse sequence interval three transmitting impulses are produced.

Figure 7:
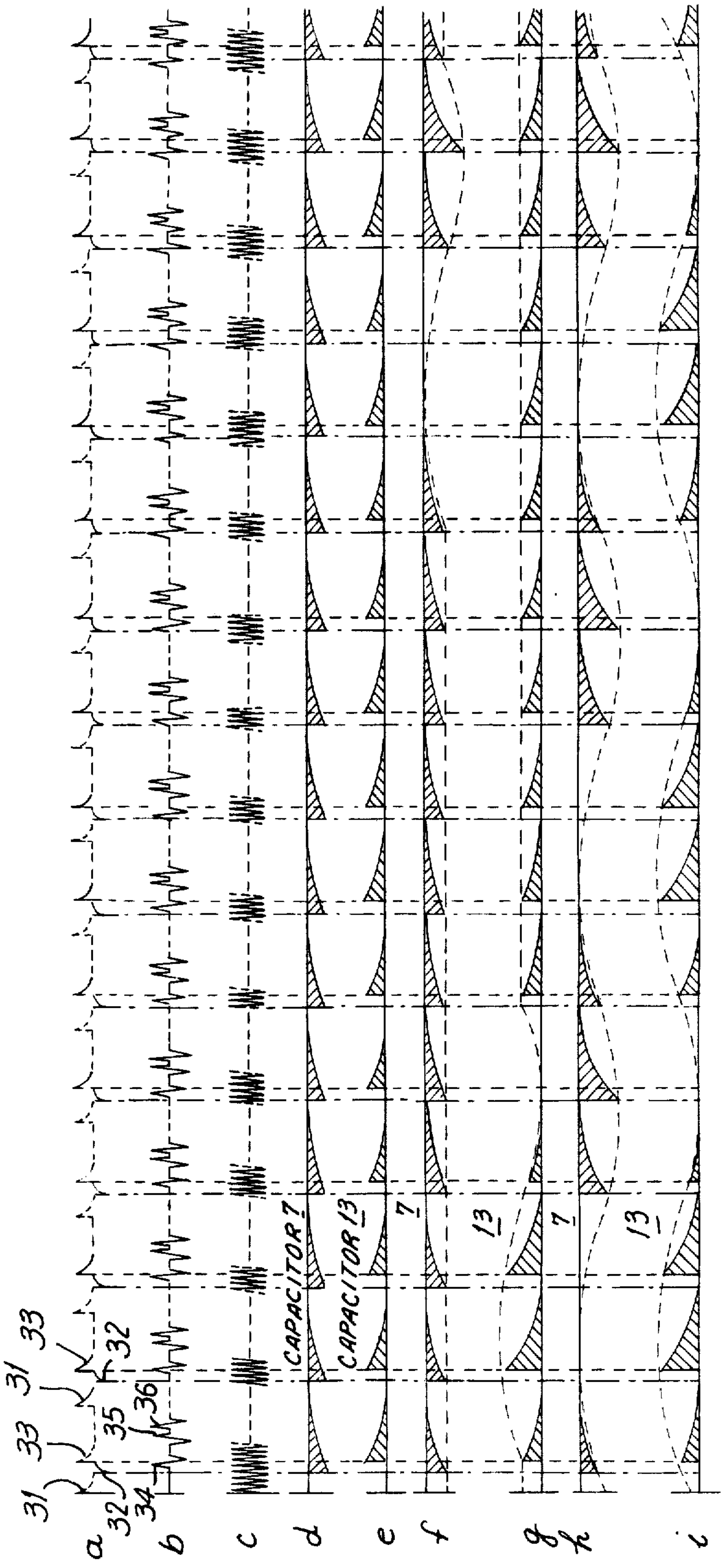
FIG. 7 is an impulse diagram for clarification of the mode of operation of the units according to FIGS. 5 and 6.

This transmitting impulse sequence can be seen in waveform a of FIG. 7. A first positive impulse 31 is followed by a negative impulse 32 as well as by an additional positive impulse 33. The time interval between the impulses 32 and 33 is smaller than the one between the impulses 31 and 32.

Whereas all three impulses 31, 32 and 33 are being radiated via the antenna, only the two impulses 32 and 33 are utilized simultaneously as scanning impulses for turning on the receiving diodes 2 and 12 respectively. The first positive transmitting impulse 31, however, is suppressed by a reverse-biasing impulse imparted to the receiving diode 12, so that impulse 31 cannot act as a scanning impulse nor prematurely turn on the receiving diode.

As already mentioned, the two impulses 32 and 33, which serve as scanning impulses, follow each other at an interval of, for example, 0.001 microseconds. For this reason, the arrangement of the two receiving diodes 2 and 12 has been so devised that for the individual scanning impulses identical travel time will elapse for their arrival at a receiving diode, whereas the receiving diodes 2 and 12 will possess opposite polarities corresponding to their scanning impulses. Consequently, the receiving diodes 2 and 12 will be turned on one after the other as a function of the time lag of, for example, 0.001 microseconds existing between the scanning impulses 32 and 33.

The further operation in both the systems represented by the block diagrams of FIG. 5 and FIG. 6 is essentially identical since in both cases a successive turn-on of the receiving diodes is obtained. A received HF signal can thus, as further provided for by process according to the invention, be imparted to the receiving diodes 2 and 12 according to the rhythm of their turned-on conditions.

How this occurs in detail is next explained on the basis of the impulse diagram of FIG. 7 which is based on the circuitry according to FIG. 6.

First of all will be discussed the case where no HF signal is received by the antenna 9 which serves both for transmitting and for receiving.

Corresponding to the turn-on rhythm of the receiving diodes 2 and 12, the charging capacitors 7 and 13 are being charged periodically as shown in waveforms d and e of FIG. 7. The charges of these capacitors will gradually run down through the leakage resistances of the receiving diodes 2 and 12 until, at the inception of new intervals, new charges will follow. Thus, two sawtooth voltages are produced at the charging capacitors 7 and 13, one of which is negative (waveform d of FIG. 7) and the other of which is positive (waveform e of FIG. 7).

The phase differences between the two sawtooth voltages is determined by the time difference between the scanning impulses 32 and 33. The maximum amplitudes of the sawtooth voltages depend in each case on the amplitudes of the scanning impulses 32 and 33. In the circuit arrangement according to FIG. 5, two similar sawtooth voltages would also result, with the one difference that they would both be negative.

Since it was supposed that there is no reception of HF signals, because, for instance, there exists neither a target reflection nor a jamming signal, the amplitudes of the sawtooth voltages will remain constant and, therefore, no LF signals can be obtained from the charging capacitors 7 and 13.

If it is assumed that a target enters the acquisition range of antenna 9 of the proximity fuze, then, in accordance with the sequence of the transmitting impulses, three target-echo impulses 34, 35 and 36 (waveform b of FIG. 7) will be produced of which, however, in each case only the first target-echo impulse 34 will be important to the receiving end. Actually, the following target-echo impulses 35 and 36 are not utilized since, at the moment of their arrival, the receiving diodes 2 and 12 will have been turned off again.

Up to the moment at which a predetermined "proximity-fuze-to-target" distance is attained, the receiving diodes are also turned off for the initial target-echo impulse 34. This predetermined distance is defined in the present examplle by corresponding to a travel time which is equal to the time lag between the first transmitting impulse 31 and the third transmitting impulse 33.

As soon as this postulated distance has been reached, the target-echo impulse 34 and the scanning impulse 33, which latter opens the receiving diode 12, will both simultaneously arrive at the receiving diode 12. On account of the relative movement of the proximity fuse relative to the target, the travel time of the transmitting impulses will now gradually diminish, so that regularly small time shifts between the periodically recurring scanning impulse 33 and the target-echo impulse 34 will result. This means, that the target-echo impulse 34 will not always hit the identical point of the scanning impulse 33 and that the latter, from interval to interval, will scan a different amplitude value of the target-echo impulse 34 received (sampling process).

The sawtooth voltage at the charging capacitor 13 thus undergoes gradual changes of its peak amplitude on account of the addition of its amplitude to the momentary amplitudes of the target-echo impulse 34 received as shown in waveform g of FIG. 7. Such changes will occur in the present example altogether for the duration of five transmitting intervals, i.e., until the moment is reached at which the incoming target-echo impulse will again find the receiving diode 12 turned-off. For the following intervals, the amplitude of the sawtooth voltage will then again remain constant according to waveform g of FIG. 7.

Thus, at the input to the LF amplifier 14 following the charging capacitor 13, a first low-frequency image of the received target-echo impulse received is formed.

The generation of the second low-frequency image of the target-echo impulse 34 can only occur a certain time after the completion of the first sampling operation because, during the entire period of time during which the target-echo impulse 34 was being scanned at the periodically turned-on receiving diode 12 and also during an additional lapse of time as can be seen from the voltage curves according to waveforms f and g of FIG. 7, the receiving diode 2 was turned off for the target-echo impulse 34 and the amplitude of the sawtooth voltage at the charging capacitor 7 remained constant (waveform f of FIG. 7).

The second sampling operation will only be initiated when the target-echo impulse 34 and the scanning impulse 32 arrive simultaneously at the receiving diode 2 so that same is turned-on and can be traversed by the target-echo impulse 34. The scanning of the target-echo impulse then proceeds in the same manner as previously described for the first sampling operation and, at the input of the LF amplifier 8, which follows after the charging capacitor 7, a second LF signal will be otained, which represents another image of the target-echo impulse 34 received (waveform f of FIG. 7).

In the following is considered the case where there exists a wobbled jamming signal lying in the Gigacycle range and which is received by the antenna 9. Such a jamming signal, in which phase and frequency shifts make a sampling operation possible, is represented in waveform c of FIG. 7. This jamming signal is equally active when the receiving diode 2 is turned-on and when, shortly thereafter, the receiving diode 12 has been turned on.

Consequently, two low-frequency images of the HF jamming signal will be produced at the charging capacitors 7 and 13, which images will have identical phasing waveforms h and i of FIG. 7. Subtractive mixing of the two LF signals will cause their precise and complete erasure, so that the proximity fuze cannot be affected by the jamming signal. Any possible asymmetries of the two LF channels would only show up as a d-c component in the subtraction.

The utilization of the previously described phase differences between two LF signals, which thus are the criteria for the presence of a true target, for the correct triggering of the fuze and the elimination of all signals originating from jamming transmitters, is taken care of in the electronic evaluation unit 11, which is connected to the LF signal outputs 10 and 15 and serves to effect subtractive mixing of the signls, as explained above, this being effected by a conventional arrangement of discriminators and subtractors. A signal output leading to the fuze mechanism is referenced at 16.

It should also be mentioned that, in the representation of the impulse diagrams of FIG. 7 a linear time scale was purposely not chosen for the sake of better clarity. Actually, the pauses between the individual pulse sequence intervals (according to waveforms a and b of FIG. 7) are much longer than shown. The brokenline representation of the joining lines between each last impulse of a preceding and each first impulse of a following interval was chosen for the purpose of furnishing an optical indication of this fact.

The pauses actually inserted between the individual pulse sequence intervals according to waveform a of FIG. 7 are chosen to be so long that any possible target-echo signal would have to originate from so great a distance that it could be expected with certainty to be weakened to such a degree that it could no longer be received. This prevents an image of a target-echo impulse returning from a farther distance, being formed at random by the scanning impulse of a later interval.

What is claimed is:

1. Apparatus sensitive to an object which has relative movement with respect to at least part of said apparatus; said apparatus comprising an antenna for transmitting radiation towards said object and receiving reflected radiation from the object, transmision impulse generating means coupled to said antenna to initiate the transmission of radiation from the latter, receiving means coupled to said antenna to receive signals therefrom and further coupled to said generating means to be actuated by the latter, and further means coupled to said receiving means and generating a signal based upon the movement of said object relative to said antenna; said further means including two means for generating low-frequency images of signals received by the antenna and means for algebraically mixing the images to cancel out jamming signals.

2. Apparatus as claimed in claim 1 wherein said receiving means includes two diodes physically spaced by a distance corresponding to one-half wavelength of the frequency to be received and biased to conduction by said generating means.

3. Apparatus as claimed in claim 1 wherein said antenna is coaxial omnidirectional radiator.

4. Apparatus as claimed in claim 1 wherein said antenna is an exponential band guide type of antenna.

5. Apparatus as claimed in claim 1 wherein said generating means includes means to generate periodic rectangular waves and means to differentiate said waves to obtain pulses, said receiving means including a diode biased to conduction by selected ones of said pulses, said further means including a sawtooth wave generator having a sawtooth output the magnitude of which is based partly on said selected pulses and partly on the timing between pulses reflected from said antenna and said selected pulses, and low-frequency selective means responsive to the sawtooth output.

6. Apparatus as claimed in claim 1 wherein said generating means includes means to generate periodic rectangular waves and means to differentiate said waves to obtain pulses, said receiving means including two diodes physically located to be biased to conduction in sequence by said pulses; said further means including sawtooth generators energized through said diodes by said pulses and by signals received by said antenna.

7. Apparatus as claimed in claim 1 wherein said generating means includes means to generate rectangular waves of different lengths and means to differentiate said waves to obtain three transmission pulses, said receiving means including two diodes biased in sequence to conduction by two of the three said pulses, said further means including sawtooth generators energized through said diodes by said pulses and by signals received by said antenna.

8. Apparatus as claimed in claim 1 wherein said generating means includes a tunnel diode.

9. Apparatus as claimed in claim 1 wherein said generating means includes a step-recovery diode.

10. A pulse radar method for use with a transmitter which transmits pulses and with a receiver system, including an antenna, comprising generating feeler pulses having a constant adjusted delay relative to the transmitter pulses, and utilizing the phase difference between the feeler pulses and the received pulses caused by the movement of the target relative to the transmitter and receiver antenna for converting the received high-frequency pulses to a low-frequency image.

11. A method as claimed in claim 10 wherein the low-frequency is obtained by sampling the high-frequency pulses, being subjected to selection in accordance with the approach velocity of the transmitter and receiver antenna relative to the object.

12. A method as claimed in claim 10 wherein the step of utilizing the phase difference between the feeler pulses and the received pulses includes periodically controlling a diode in said receiver system by said feeler pulses.

13. A method as claimed in claim 10, including the steps of arranging a pair of diodes in said receiver system in a mutually spaced relationship and periodically controlling said pair of diodes by said feeler pulses, producing an operating time difference between the pair of diodes corresponding to a one-half wavelength of the frequency to be received, and subtracting the output voltages of the diodes from each other.

* * * * *